Patented Feb. 11, 1947

2,415,638

UNITED STATES PATENT OFFICE 2,415,638

RESINOUS COPOLYMERS OF 4-METHYLENE-1,3-DIOXOLANE

William O. Kenyon and Thomas F. Murray, Jr., Rochester, N. Y., assignors to Eastman Kodak Company, Rochester, N. Y., a corporation of New Jersey No Drawing. Application August 15, 1942, Serial No. 454,906

12 Claims. (Cl. 260—66)

This invention relates to resinous polymers and more particularly to copolymers obtained by the conjoint polymerization of 4-methylene-1,3-dioxolanes with other unsaturated organic compounds.

Monomeric 4-methylene-1,3-dioxolanes having the following general formula:

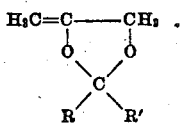

wherein R and R' each represents hydrogen, an alkyl group or an aryl group can be prepared by the method of H. O. L. Fischer et al., Ber. 63B, 1732 to 1744 (1930). Attempts to homopolymerize such monomers wherein R represents hydrogen and R' represents an alkyl group have failed.

We have now found that 4-methylene-1,3-dioxolanes can be copolymerized with other unsaturated organic compounds to yield useful resinous materials. Moreover, we have found that 4-methylene-2-phenyl-1,3-dioxolanes, as well as other 2-aryl-4-methylene-1,3-dioxolanes can be homopolymerized. It is, accordingly, an object of our invention to provide new resinous polymers and to provide a process for preparing the same. Other objects will become apparent hereinafter.

In accordance with our invention, we copolymerize a 4-methylene-1,3-dioxolane with an unsaturated organic compound, especially an unsaturated organic compound containing a carbon-to-carbon double bond conjugated with a carbon-to-oxygen double bond, such as α-methylene carboxylic acids and their esters, vinyl ketones and anhydrides of ethylene-1,2-carboxylic acids (i. e. anhydrides of 1,2-dicarboxyethylenes). With many of such unsaturated organic compounds, the 4-methylene-1,3-dioxolanes copolymerize very rapidly without the application of external heating and without a catalyst. In fact, in some instances a diluent for the reactants, e. g. 1,4-dioxane, and/or external cooling may be necessary to moderate the violence of the reaction. With some of the other unsaturated compounds, the polymerization is advantageously accelerated by heating or by the use of catalysts, such as the catalysts which are known to effect the polymerization of organic compounds containing a

group, e. g. organic peroxides such as benzoyl peroxide, acetyl benzoyl peroxide, etc.

The following examples will serve to illustrate our new resinous polymers and the process for preparing the same.

*Example 1.—Copolymer of 2-methyl-4-methylene-1,3-dioxolane and α-methacrylic acid*

5 g. of 2-methyl-4-methylene-1,3-dioxolane and 5 g. of α-methacrylic acid were mixed. The mixture warmed spontaneously and became hard. The hard product was brilliant, clear and colorless. It was dissolved in a mixture of acetone and water and precipitated by pouring the solution into a mixture of two volumes acetone and one volume of diethyl ether. The product was flocculent when precipitated but became sticky when brought from the precipitating liquid into the air. It was dried at 60° C., giving a brittle, glossy, colorless material. The material was analyzed for carbon and hydrogen and found to contain 54.66 percent by weight of carbon and 7.69 percent of hydrogen. A similar product was dissolved in water and titrated with standard sodium hydroxide. It was found to contain 66.5 percent of α-methacrylic acid. From these results it appeared that some acetaldehyde was split off from the dioxolane during polymerization, and that the copolymer contained α-methacrylic acid 66.5 percent, dioxolane compound 11.4 percent and the corresponding dialcohol 22.1 percent.

Varying the proportion of the monomers used affects the type of copolymer obtained with α-methacrylic acid. Below are given the results obtained when the ratio of the monomers was changed. No catalyst was used in the polymerizations.

| 2-methyl-4-methylene-1,3-dioxolane | α-Methacrylic acid | Result |
|---|---|---|
| Per cent by weight | Per cent by weight | |
| 90 | 10 | Solid but soft, even after 15 days at 60° C. |
| 80 | 20 | Do. |
| 60 | 40 | Polymerized in about 2 hours at 60° C. but was slightly soft. It was hard 4 days later. |
| 40 | 60 | Polymerized clear and hard in about 2 hours. |
| 20 | 80 | Polymerized hard, white and opaque in about 2 hours. |
| 10 | 90 | Do. |

*Example 2.—Copolymer of 2-methyl-4-methylene-1,3-dioxolane and maleic anhydride*

When 2-methyl-4-methylene-1,3-dioxolane and maleic anhydride were mixed, they reacted violently, giving off considerable heat and producing a dark polymer. The reaction can be modified by carrying it out in a diluent, such as acetone or preferably 1,4-dioxane.

25 g. of maleic anhydride were dissolved in 50 g. of dry 1,4-dioxane. 25 g. of 2-methyl-4-methylene-1,3-dioxolane were added to the solution. Reaction began with external heating and was modified by slight warming or cooling, as required, by running water over the flask in which the reaction was being carried out. When the reaction mixture has become quite viscous, it was warmed on a steam bath for ½ hour. At the end of this time, the reaction mixture was very viscous, clear and substantially colorless. It was diluted with 1,4-dioxane and the resinous copolymer was precipitated by pouring the dioxane mixture into benzene. The precipitated copolymer was dried at 50° to 60° C. and found to contain 53.43 percent of carbon and 5 percent of hydrogen. These values agree well with the calculated values of 54.5 percent of carbon and 5.06 percent of hydrogen in a copolymer containing equimolecular proportions of maleic anhydride and the dioxolane.

*Example 3.—Copolymer of 2-methyl-4-methylene-1,3-dioxolane and methyl α-methacrylate*

A mixture was made of 4 g. of 2-methyl-4-methylene-1,3-dioxolane, 16 g. of methyl α-methacrylate and 0.2 g. of benzoyl peroxide. The vessel containing the mixture was closed and maintained at 60° C. for 24 hours. A hard clear, colorless copolymer resulted. The copolymer was dissolved in acetone and precipitated by pouring the acetone solution into water. Although the dioxolane in the starting reaction mixture was equal to 20 percent by weight of reaction mixture, the copolymer contained only 6.05 percent combined dioxolane. When 10 percent of the dioxolane was employed in the starting reaction mixture, the copolymer contained 4.6 percent and when 40 percent of the dioxolane was employed in the starting reaction mixture, the copolymer contained 11.25 percent combined dioxolane.

A series of these copolymers of 2-methyl-4-methylene-1,3-dioxolane and methyl α-methacrylate were compression molded and the physical properties of the molded products compared.

| Ratio of dioxolane to methyl α-methacrylate in starting reaction mixture | 10/90 | 15/85 | 20/80 | 30/70 |
|---|---|---|---|---|
| Impact strength | 9.16 | 4.64 | 3.90 | 2.69 |
| Hardness: | | | | |
| Shore | 83.8 | 86.0 | 84.0 | 64.8 |
| Rockwell | 107.6 | 100.4 | 91.6 | 27.6 |
| Elongation, percent | 4.33 | 4.00 | 7.66 | 3.66 |
| Strength: | | | | |
| Tensile | 7,100 | 4,820 | 6,060 | 1,440 |
| Flexural | 14,920 | 8,180 | 9,590 | 1,015 |

The copolymer formed by starting with 10 percent of the dioxolane in the reaction mixture has excellent physical properties and is particularly useful because of its hardness.

Instead of methyl α-methacrylate other esters of α-methacrylic acid can be employed, e. g., ethyl α-methacrylate, n-primarybutyl α-methacrylate and isobutyl α-methacrylate. These materials are rather soft when molded and do not hold their shape well. They were, however, transparent when molded.

*Example 4.—Copolymer of 2-methyl-4-methylene-1,3-dioxolane and acrylic acid*

10 g. of acrylic acid were dissolved in 20 g. of dry 1,4-dioxane. To the solution were added 10 g. of 2-methyl-4-methylene-1,3-dioxolane. The mixture was heated in a 60° C. bath under a reflux condenser. In about ½ hour the reaction mixture had become a viscous solution. Heating was continued for about 3 additional hours. The reaction mixture was then diluted with 1,4-dioxane and the copolymer precipitated by pouring the dioxane solution into carbon tetrachloride.

*Example 5.—Copolymer of 2-methyl-4-methylene-1,3-dioxolane and methyl acrylate*

A mixture was made of 25 g. of 2-methyl-4-methylene-1,3-dioxolane, 25 g. of methyl acrylate and 0.5 g. of benzoyl peroxide. The mixture was warmed under reflux at 60° C. for about 6 hours and then cooled. Polymerization was very smooth. The resulting polymer was very soft and tacky.

*Example 6.—Copolymer of 2-methyl-4-methylene-1,3-dioxolane and methyl vinyl ketone*

A mixture of equal parts of 2-methyl-4-methylene-1,3-dioxolane and methyl vinyl ketone gave a soft polymer in about 72 hours, warming at 60° C. with no catalyst.

*Example 7.—Copolymer of 2-methyl-4-methylene-1,3-dioxolane, vinyl acetate and α-methacrylic acid*

A solid, though soft, copolymer was obtained when a mixture of 5 g. of 2-methyl-4-mthylene-1,3-dioxolane, 5 g. of vinyl acetate and 1 g. of methacrylic acid were kept at 60° C. for 24 hours. No catalyst was used.

*Example 8.—Copolymer of 4-methylene-1,3-dioxolane and α-methacrylic acid*

5 g. of 4-methylene-1,3-dioxolane and 5 g. of methacrylic acid were mixed. After one hour standing at 20° to 25° C., no significant polymerization had occurred. The mixture was then placed in an oven at 60° C. and allowed to stand at this temperature 12 to 15 hours. A solid, hard, clear, bubble-free resinous copolymer was obtained.

*Example 9.—Copolymer of 4-methylene-1,3-dioxolane and methyl α-methacrylate*

37.5 g. of 4-methylene-1,3-dioxolane and 87.5 g. of methyl α-methacrylate and 1.0 g. of benzoyl peroxide were mixed and the mixture heated in a hot water bath at 40° C. After 48 hours a hard, clear, colorless resinous copolymer was obtained. The copolymer did not retain its shape well upon molding.

*Example 10.—Copolymer of 2-(n-propyl)-4-methylene-1,3-dioxolane and α-methacrylic acid*

6.4 g. of 2-(n-propyl)-4-methylene-1,3-dioxolane and 4.3 g. of α-methacrylic acid were mixed. 0.1 g. of benzoyl peroxide was added to the mixture. The mixture was then heated at 50° to 60° C. and in less than one hour polymerized to give a somewhat opaque, hard, plastic mass which swelled considerably, but did not dissolve in 10 percent aqueous sodium hydroxide. A similar procedure, without catalyst, gave a similar resinous product.

Example 11.—Copolymer of 2-phenyl-4-methylene-1,3-dioxolane and α-methacrylic acid 8 g. of 2-phenyl-4-methylene-1,3-dioxolane and 4.3 g. of α-methacrylic acid were mixed. Polymerization occurred spontaneously at 20° to 25° C. in a few minutes to give a slightly cloudy, slightly soft resinous copolymer which became hard in about 72 hours. The copolymer was soluble in acetone but practically insoluble in 10 percent aqueous sodium hydroxide, although it swelled some in this reagent and turned reddish brown.

Example 12.—Copolymer of 2,2-dimethyl-4-methylene-1,3-dioxolane and maleic anhydride Equimolecular proportions of 2,2-dimethyl-4-methylene-1,3-dioxolane and maleic anhydride reacted so vigorously that it was necessary to cool the mixture to control the polymerization. At the end of one hour at 20° to 25° C., the polymerization product was too viscous to flow and upon further standing at 20° to 25° C. an opaque resinous copolymer obtained.

Example 13.—Copolymer of 2-phenyl-4-methylene-1,3-dioxolane and maleic anhydride Equimolecular proportions of 2-phenyl-4-methylene-1,3-dioxolane and maleic anhydride reacted vigorously as in the preceding Example 12 with similar results.

Example 14.—Copolymer of 2-methylene-1,4-dioxaspiro [4.5] decane and α-methacrylic acid 7.8 g. of 2-methylene-1,4-dioxaspiro [4.5] decane and 4.3 g. of α-methacrylic acid were mixed and the mixture heated in an oven at 50° to 60° C. 24 hours later, a hard copolymer had formed which was clear except for a small opaque area in the center of the reaction mass. On further standing this opaque area disappeared, yielding a perfectly clear yellow material which was soluble in acetone, but only partly soluble in aqueous 10 percent alkali.

Example 15.—Copolymer of 2-methylene-1,4-dioxaspiro [4.5] decane and methyl α-methacrylate 7.8 g. of 2-methylene-1,4-dioxaspiro [4.5] decane were mixed with 5 g. of methyl α-methacrylate. 0.13 g. of benzoyl peroxide were added to the mixture. The resulting mixture was heated at 50° to 60° C. for 24 hours. A soft copolymer resulted which was dissolved in acetone. The acetone solution was poured into water to precipitate the copolymer which was dried at 50° to 60° C. Analysis showed a carbon content of 64.4 percent and a hydrogen content of 8.3 percent. This carbon content indicated that the copolymer contained 58 percent of combined methyl methacrylate. Two methoxyl determinations showed an average value of 16 percent for methoxyl content, indicating that the copolymer contained 54 percent combined methyl α-methacrylate.

Example 16.—Copolymer of 2-methylene-1,4-dioxaspiro [4.5] decane and maleic anhydride 7.8 g. of 2-methylene-1,4-dioxaspiro [4.5] decane were mixed with 5 g. of maleic anhydride. The mixture polymerized spontaneously and produced a yellowish brown polymer. This was dissolved in acetone. The copolymer was precipitated by pouring the acetone solution into diethyl ether. The resin was filtered off, washed with diethyl ether and dried. The two monomers were employed in equimolecular proportion, and if combined in equimolecular proportion, the calculated carbon and hydrogen contents of the copolymers would be 61.9 percent and 6.34 percent respectively. The analytical values obtained were 61.4 percent of carbon and 6.24 percent of hydrogen.

Example 17.—Copolymer of 2-(m-tolyl)-4-methylene-1,3-dioxolane and α-methacrylic acid 8.8 g. of 2-(m-tolyl)-4-methylene-1,3-dioxolane and and 4.3 g. (an equimolecular proportion) of α-methacrylic acid were mixed. The temperature rose spontaneously, and in a few minutes the mixture was too viscous to flow. It was allowed to stand at 20° to 25° C. for 72 hours, whereupon a hard, clear, colorless copolymer was obtained. This was dissolved in acetone. The acetone solution was poured into diethyl ether to precipitate the copolymer. The copolymer was washed with diethyl ether, and dried in vacuo at 20° C. to 25° C. The copolymer contained 67.86 percent of carbon and 6.72 percent of hydrogen which compared reasonably well with the calculated values of carbon 68.8 percent and hydrogen 6.88 percent for a copolymer containing equimolecular proportions of combined dioxolane and α-methacrylic acid.

Example 18.—Copolymer of 2-(p-chlorophenyl)-4-methylene-1,3-dioxolane and α-methacrylic acid 8.8 g. of 2-(p-chlorophenyl)-4-methylene-1,3-dioxolane and 4.3 g. of methacrylic acid were mixed and the mixture heated in an oven at 50° to 60° C. At the end of four days, a clear, hard, colorless copolymer had formed.

Example 19.—Copolymer of 2-methyl-4-methylene-1,3-dioxolane and methyl isopropenyl ketone 5 g. of 2-methyl-4-methylene-1,3-dioxolane were mixed with 5 g. of methyl isopropenyl ketone. The mixture was allowed to stand at 20° to 25° C. for 72 hours with no apparent change. 0.1 g. of benzoyl peroxide catalyst was added to the mixture, and after it had dissolved, the resulting solution was placed in an oven at 60° C. Twenty-five days later, a hazy copolymer had formed. The copolymer was dissolved in acetone and precipitated by pouring the acetone solution into water. After drying the copolymer was found to contain 68.2 percent of carbon and 9.14 percent of hydrogen which indicated that about 72 percent of the copolymer was combined isopropenyl ketone and the remainder combined dioxolane.

Example 20.—Homopolymer of 2-phenyl-4-methylene-1,3-dioxolane 10 g. of 2-phenyl-4-methylene-1,3-dioxolane were mixed with 0.1 g. of benzoyl peroxide. The mixture was heated at 50° to 60° C. for 48 hours. The homopolymer which formed was hard and clear. It was soluble in acetone and precipitated when the acetone solution was poured into water.

Example 21.—Homopolymer of 2,2-dimethyl-4-methylene-1,3-dioxolane 5.7 g. of 2,2-dimethyl-4-methylene-1,3-dioxolane polymerized in a very few minutes at 20° to 25° C. with catalyst, to give an opaque solid which became clear upon standing for 72 hours. The homopolymer was a brittle material, soluble in acetone.

We have found that traces of apparently nitrogenous substances in the dioxolanes inhibit the polymerization of the dioxolanes. These inhibitors can be removed by washing the dioxolane with dilute acetic acid. The following example illustrates the inhibition and treatment of the dioxolane.

*Example 22.—Copolymerization of 2-methylene-1,4-dioxaspiro[4.5] decane with α-methacrylic acid*

5 g. of 2-methylene-1,4-dioxaspiro [4.5] decane prepared by dehydrohalogenating the cyclohexanone ketal of glycerol α-monochlorohydrin (2-methyl-4-chloromethyl-1,3-dioxolane) in the presence of triethanol amine, were mixed with an equal weight of α-methacrylic acid. Three days later, the mixture was thin and yellow. Upon shaking, it became more viscous, and after a few hours standing, the viscosity had further increased. After an additional period of three days, a hard yellow copolymer had formed.

A portion of the same dioxolane prepared as indicated above was extracted with 10 percent aqueous acetic acid. The aqueous acid layer became light brown in color and the layer of dioxolane was colorless. The dioxolane layer was dried over magnesium sulfate and potassium carbonate, filtered from these salts and distilled. The dioxolane treated in this manner polymerized promptly when mixed with an equal part of α-methacrylic acid.

Our resinous copolymers are especially useful for the manufacture of molding articles. The molding can be accomplished by causing the copolymers to form in a suitable mold or by compressing the copolymers after they have been formed by means of the usual molding machinery. Those of the copolymers which show satisfactory solubility in organic solvents can be made up into varnishes or lacquers with or without the addition of other resinous bodies or cellulose derivatives. The resinous copolymers can also be successfully applied to the manufacture of laminated sheets of materials such as glass, cellulose nitrate, cellulose acetate, or wood. The copolymers can also be used to impregnate fabrics, wood and the like, for the purposes of water-proofing and preservation. Our resinous copolymers can also be extruded into the form of film or sheet. Film or sheet can also be made from the copolymers by dissolving about one part of the copolymer in a suitable organic solvent which may be a single solvent or a mixture of solvents, and coating the resulting solution to desired thinness on a film-forming surface such as a glass or metal plate or table or revolving drum. When the solvent has been evaporated (this can be conveniently accelerated by means of warm air), the resulting film or sheet can be stripped from the film-forming surface and subjected to curing (removal of excess solvent) by heating in warm air. The resulting cured film or sheet can be used for a variety of purposes including that of a support for light-sensitive photographic silver halide emulsions of the gelatino or other types. Plasticizers can be incorporated in the copolymers prior to molding.

While the preparation of 4-methylene-1,3-dioxolanes is described by H. O. L. Fischer et al. (supra), the following examples will serve to illustrate the preparation of some embodiments not specifically disclosed.

*Example 23.—2-methylene-1,4-dioxaspiro [4.5] decane*

$$\begin{array}{c}H_2\ H_2\\C—C\quad O—C=CH_2\\H_2C8\overset{9}{\diagup}\overset{10}{\diagdown}C5\overset{1}{\diagup}\overset{2}{\diagdown}\\\overset{7}{\diagdown}\overset{6}{\diagup}\overset{4}{\diagdown}\overset{3}{\diagup}\\C—C\quad O—CH_2\\H_2\ H_2\end{array}$$

110 g. of glycerol α-monochlorohydrin, 110 g. of cyclohexane and 10 cc. of concentrated hydrochloric acid (about 36 percent hydrogen chloride) were heated on a steam bath for one hour. At the end of this time ice was added to the mixture and the lower layer was separated off and washed with water at about 23° C. To the washed product were added 15 g. of triethanol amine, and the resulting mixture was heated in an oil bath at 145° C. under a refluxed condenser. 40 g. of powdered sodium hydroxide were added to the reaction mixture through the condenser. The resulting mixture was heated at 145° C. for two hours, following which the volatile products were distilled off under reduced pressure. The distillate was washed with 10 percent aqueous acetic acid, then with distilled water, and finally dried over anhydric potassium carbonate for 24 hours. The carbonate was removed by filtration and the filtrate distilled under reduced pressure using a modified Claisen flask.

*Example 24.—2-phenyl-4-methylene-1,3-dioxolane*

$$\begin{array}{c}C_6H_5\quad O—C=CH_2\\\diagdown\overset{3}{\phantom{C}}\overset{4}{\diagup}\\C2\\\diagup\overset{1}{\phantom{C}}\overset{5}{\diagdown}\\H\quad O—CH_2\end{array}$$

135 g. of glycerol α-monochlorohydrin and 216 g. of benzaldehyde were placed in a 500 cc. modified Claisen flask. The mixture was heated for three hours at 140° C. (± 5°), during which time a small amount of water distilled. The mixture was then distilled under reduced pressure, whereupon a forerun of benzaldehyde resulted. The benzal α-monochlorohydrin boiled at 120° to 126° C. at 6 mm. of Hg pressure, the large majority distilling at about 125° C. The benzal α-monochlorohydrin was placed in a flask with 150 g. of crushed potassium hydride and heated at 100° C. for ½ hour and the temperature was then raised to 125° C. to 130° C. for a further 1½ hours. After cooling, the excess potassium hydride and the potassium chloride were dissolved in 500 cc. of water and the resulting oil was taken up with diethyl ether. After drying the ether solution over potassium carbonate, the ether was evaporated and the residue distilled under reduced pressure using a modified Claisen flask. The dioxolane compound boiled at 87° to 89° C. at 3 mm. of Hg pressure.

*Example 25.—4-methylene-1,3-dioxolane*

$$\begin{array}{c}O—C=CH_2\\\overset{3}{\diagup}\overset{4}{\diagdown}\\H_2C2\\\overset{1}{\diagdown}\overset{5}{\diagup}\\O—CH_2\end{array}$$

120 g. of trioxymethylene, 450 g. of glycerol α-monochlorohydrin and 50 cc. of concentrated hydrochloric acid (about 36 percent hyrogen chloride) were mixed together and heated on a steam bath under a refluxed condenser for one hour. The clear liquid thus obtained was washed with water and mixed with 30 cc. of triethanol amine and 120 g. of powdered sodium hydroxide. The mixture was heated in an oil bath, at refluxing temperature, for 2½ hours. The resulting product was distilled through a short column, Some water distilled over with the 4-methylene-1,3- dioxolane. Water was separated off and the dioxolane washed with distilled water and then dried over potassium carbonate. The dioxolane was redistilled through a column packed with copper helices. The boiling point was 87.5° C.

The dioxane described in Example 23 and utilized in Examples 15, 16 and 22 is a spiro compound since it contains one and only one carbon atom common to two ring systems and hence cannot be conveniently named in the same manner as the other dioxolanes. However, since the spiro compound is clearly a dioxolane of the same category as the other 4-methylene-1,3-dioxolanes, it is intended to come under the generic term "a 4-methylene-1,3-dioxolane."

What we claim as our invention and desire to be secured by Letters Patent of the United States is:

1. A process for preparing a resinous copolymer comprising polymerizing a mixture of 2-methyl-4-methylene-1,3-dioxolane with methyl methacrylate, said mixture containing about 10 per cent by weight of 2-methyl-4-methylene-1,3 dioxolane.

2. A process for preparing a resinous copolymer comprising polymerizing a mixture of about equal parts by weight of maleic anhydride and a 4-methylene-1,3-dioxolane.

3. A process for preparing a resinous copolymer comprising polymerizing a mixture of about equal parts by weight of maleic anhydride and 2-methyl-4-methylene-1,3-dioxolane.

4. A process for preparing a resinous copolymer comprising polymerizing a mixture of about equal parts by weight of methyl isopropenyl ketone and 2-methyl-4-methylene-1,3-dioxolane.

5. A process for preparing a resinous copolymer comprising polymerizing a mixture of a 4-methylene-1,3-dioxolane and another unsaturated organic compound selected from the group consisting of acrylic acid, α-methacrylic acid, maleic anhydride, methyl vinyl ketone, methyl isopropenyl ketone, vinyl acetate, methyl acrylate and esters of α-methacrylic acid and an alcohol of the formula $C_nH_{2n+1}OH$ wherein $n$ represents a positive integer of from 1 to 4, the dioxolane constituting from 10 to 90 per cent by weight of the mixture.

6. A process for preparing a resinous copolymer comprising polymerizing, in the presence of an organic peroxide, a mixture of a 4-methylene-1,3-dioxolane and another unsaturated organic compound selected from the group consisting of acrylic acid, α-methacrylic acid, maleic anhydride, methyl vinyl ketone, methyl isopropenyl ketone, vinyl acetate, methyl acrylate and esters of α-methacrylic acid and an alcohol of the formula $C_nH_{2n+1}OH$ wherein $n$ represents a positive integer of from 1 to 4, the dioxolane constituting from 10 to 90 per cent by weight of the mixture.

7. A resinous copolymer obtained by the process of claim 5.

8. A resinous copolymer obtained by the process of claim 6.

9. A resinous copolymer obtained by the process of claim 1.

10. A resinous copolymer obtained by the process of claim 2.

11. A resinous copolymer obtained by the process of claim 3.

12. A resinous copolymer obtained by the process of claim 4.

WILLIAM O. KENYON.
THOMAS F. MURRAY, Jr.

REFERENCES CITED

The following references are of record in the file of this patent:

UNITED STATES PATENTS

| Number | Name | Date |
|---|---|---|
| 2,098,108 | Reppe | Nov. 2, 1937 |
| 2,088,577 | Conaway | Aug. 3, 1937 |

FOREIGN PATENTS

| Number | Country | Date |
|---|---|---|
| 339,882 | British | Dec. 18, 1930 |
| 340,008 | British | Dec. 19, 1930 |
| 487,604 | British | June 22, 1938 |

OTHER REFERENCES

Fischer et al.: Ber. 63B, 1732–44 (1930), Chemical Abstracts, vol. 24, page 5024 (1930).

Whelan: J. Amer. Chem. Soc., vol. 51, pages 3115–23 (1929).

Richter-Spielman, Organic Chemistry, vol. I, 2nd. ed., pages 492 and 507.

Chemical Abstracts, vol. 23, page 5468 (1929).